United States Patent Office 3,017,390
Patented Jan. 16, 1962

3,017,390
RING-SUBSTITUTED N-VINYL-2-OXAZOLI-
DINONE COPOLYMERS
Forrest A. Ehlers, Walnut Creek, Calif., assignor to The
Dow Chemical Company, Midland, Mich., a corporation of Delaware
No Drawing. Filed Apr. 1, 1958, Ser. No. 725,523
12 Claims. (Cl. 260—77.5)

The present invention resides in the general field or organic chemistry and contributes especially to the polymer art. More particularly, this invention relates to novel, dye-receptive, normally solid copolymers of certain ring-substituted N-vinyl-oxazolidinone monomers (hereinafter generically referred to for convenience and simplicity as VO-X monomers) and various cross-linking, polyfunctional monomers, which copolymers are cross-linked and generally water-insoluble products.

Many of the polymers and copolymers that are comprised of VO-X monomers are attributed with a pronounced capacity for accepting a wide variety of dyestuffs. As a consequence, it is beneficial to employ such polymeric materials as dye-assisting adjuvants in synthetic fiber-forming polymeric compositions that may ordinarily be difficult to dye, especially in acrylonitrile polymer compositions, in order to enhance the dye-receptive properties of such compositions. Although their utilization in this manner is desirable, the conventional polymers and copolymers of VO-X monomers, particularly homopolymers of N-vinyl-5-methyl-2-oxazolidinone (hereinafter referred to as VO-M), are quite susceptible to being dissolved in water. This characteristic, as can be appreciated, may diminish the complete advantage that might otherwise be secured by their employment as dye-assisting adjuvants in polymeric fiber-forming compositions. Dissatisfactory results may be especially manifest when the compositions are fabricated into such shaped articles as fibers and the like including cloth and fabric constructed therefrom which are commonly subjected to the extractive influence of water whenever they are washed, scoured or laundered during their manufacture or in the course of their useful life as a textile article, or both.

As may be apparent, one of the undesirable consequences of employing a water-soluble dye-assisting adjuvant in fiber-forming polymeric compositons is to require that a sufficiently large quantity of the additament be incorporated in the composition to ensure that the shaped articles, particularly textile fibers, prepared from such composition may have an acceptable dye-receptivity despite dissolution losses of the adjuvant that may be encountered prior to dyeing the shaped article. Frequently the quantities of the adjuvant that must be employed to compensate for dissolution losses are so large as to deleteriously influence the properties of the composition. Another difficulty that may be encountered when employing water-soluble dye-assisting adjuvants in polymeric fiber-forming compositions is to impart poor washfastness to the dyed, shaped articles that may be prepared from the compositions.

It would be advantageous, and it is among the principal objects of the present invention, to provide dye-receptive copolymers of VO-X monomers, especially copolymers of VO-M, that are insoluble in water and particularly adapted for being employed and permanently retained as dye-assisting adjuvants in synthetic polymeric fiber-forming compositions, especially in acrylonitrile polymer compositions.

To the attainment of these and related ends, a dye-receptive, water-insoluble copolymer that is especially well suited for being employed as a dye-assisting adjuvant in synthetic, fiber-forming, polymeric compositions, particularly acrylonitrile polymer compositions, is comprised of a copolymer of a VO-X monomer and a cross-linking, polyfunctional monomeric material that is copolymerizable therewith. Advantageously, as mentioned, the VO-X monomer that is copolymerized with the polyfunctional monomer is VO-M. It is usually beneficial for the copolymers of the present invention to contain a major proportion (i.e., at least 50 weight percent) of the VO-X monomer polymerized in the copolymer. Usually, for example, it is desirable for the copolymer to contain between about 80 and 98 percent by weight of the VO-X monomer polymerized in the copolymer molecule, particularly when the copolymer is intended for application as a dye-assisting adjuvant. In certain instances it may be more satisfactory for the copolymer that is intended for such application to contain in the neighborhood of 90 percent by weight of the VO-X monomer polymerized in the copolymer molecule. In many cases, however, especially if the cross-linking, polyfunctional comonomer has a dye-receptive nature (as occurs with such monomers as methylene-bis-acrylamide and its close homologues) it may be satisfactory for the copolymer to contain between about 2 and 98 percent by weight of the VO-X monomer polymerized in the copolymer molecule.

Typically representative of the polyfunctional monomers that may be utilized in the practice of the present invention are those set forth in the following tabulations which are intended to be illustrated and not limiting and to fully imply the close equivalent homologues and isomers of the indicated compounds:

Table A.—Vinyl-containing hydrocarbons

Divinyl benzene
1,5-dipentadiene

Table B.—Ethylenically unsaturated polyalcohols

Diallyl glycerol
Diallyl sorbitol
Diallyl pentaerythritol
Diethylene glycol divinyl ether Table C.—Acrylic and methacrylic acid derivatives Alkylene and alkylidene-bis-acrylamides
Ethylene diacrylate
Allyl acrylate
Polyalkylene glycol diacrylates Table D.—Ethylenically unsaturated esters of polybasic acids or pseudo acids Diallyl adipate
Diallyl maleate
Diallyl fumarate
Triallyl cyanurate
Triallyl isocyanurate Table E.—Others Vinyl crotonate
Diethylene glycol-bis-allyl-carbonate
Diallylbenzene phosphonate
2,4-diallyloxy-6-amino-5-triazine
Triacrylylperhydrotriazine Frequently, polyfunctional monomers of the type set forth in Tables C and D are more advantageous to employ. It is oftentimes of most benefit to use a dye-receptive, water-insoluble, cross-linked copolymer of the indicated variety that contains as the polyfunctional monomeric ingredient or constituent one that has been selected from the group consisting of methylene-bis-acrylamide, divinyl benzene, dialyl glycerol, tetraethyleneglycol dimethacrylate, triallyl cyanurate, triacrylylperhydrotriazine or their mixtures.

The VO-X monomers that are used for the preparation of the water-insoluble, cross-linked copolymeric products are of the general structure:

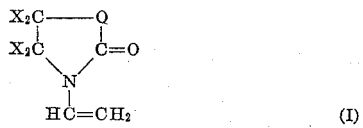

(I)

wherein each X is independently selected from the group consisting of hydrogen, alkyl radicals containing from 1 to about 4 carbon atoms, and aryl radicals containing from 6 to about 10 carbon atoms with the limitation that not more than three of the X substituents can be hydrogen. As mentioned, it is highly advantageous to utilize VO-M in the copolymers of the present invention. The structure of VO-M is:

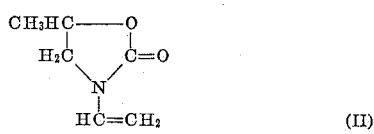

(II)

Other typical VO-X monomers that may be employed with advantage are such species as N-vinyl-4-methyl-2-oxazolidinone; N-vinyl-4,5-dimethyl-2-oxazolidinone; N-vinyl-5,5-dimethyl-2-oxazolidinone; N-vinyl-5-ethyl-2-oxazolidinone; N-vinyl-5-chloromethyl-2-oxazolidinone; N-vinyl-5-phenyl-2-oxazolidinone, and the like.

The copolymers of the present invention may be prepared by polymerizing the monomeric ingredients at an elevated temperature under basic conditions in an aqueous (or other suitable solvent) medium with the assistance of a suitable catalyst such as a peroxy or azo type polymerization catalyst. Thus, the monomers may be dispersed in water containing a sufficient quantity of ammonium hydroxide to provide a pH of between about 6 and 12 in the reaction mass and may be polymerized under such basic conditions with the assistance of hydrogen peroxide, potassium persulfate, $\alpha,\alpha'$-azobisisobutyronitrile or the like as a catalyst. While temperatures between about 20° C. and the boiling point may be suitable, it is ordinarily satisfactory to conduct the polymerization at a temperature of about 50 to 80° C. Usually, depending on the specific factors that may be involved, the polymerization may be accomplished satisfactorily within a time period of from 10 to about 60 hours.

The polymerization system that is employed for the preparation of the copolymers of the present invention may consist of as much as 50 or more percent by weight of the monomers to be polymerized in the aqueous or other solvent medium. The amount of monomeric material that is provided in the polymerization system may be influenced somewhat by the subsequent manner in which it may be desired to utilize the copolymers, especially when they are intended to be employed as dye-assisting adjuvants in polymeric compositions.

Thus, if it is intended to incorporate them as blended copolymers in a fiber-forming composition prior to its fabrication into shaped articles, the polymerization system, may, if desired, contain about equal proportions by weight of the charged monomeric materials and the aqueous polymerization medium. In such cases, the copolymer product may ordinarily be obtained as a gel (particularly when the polymerization has been accomplished without agitation) that, after being dried and isolated from unreacted monomer, may be incorporated in the fiber-forming composition. The copolymer may be physically reduced by comminution to a sufficiently fine state to permit its dispersion in spinnable condition throughout the blended fiber-forming composition.

If the incorporation of the copolymer as a dye-assisting adjuvant in a fiber-forming composition is to be achieved by impregnation therewith of an already formed shaped article of the composition, it may be desirable to effect the polymerization so as to directly form the polymerization system as a suitable applicating emulsion or suspension of the copolymer product. For such purposes, the polymerization system may be prepared to contain as little as 5 or 10 percent by weight of the copolymerizing monomeric ingredients. Preferably, such a polymerization may be conducted under the influence of vigorous agitation to facilitate preparation of the copolymer emulsion. It may also be beneficial under such circumstances to incorporate a dispersant or emulsifying agent in the polymerization system to facilitate obtaining a stable and homogeneous emulsified product. Such a method for preparing the copolymers of the invention may be especially appropriate when they are intended to be applied as dye-assisting adjuvants to polyacrylonitrile fibers that are derived from aquagels in the course of their manufacture. In such instances, the emulsified copolymer may be impregnated into the fiber while it is in an aquagel condition in order to obtain the desired dye-receptive copolymer-containing fiber product.

The copolymers of the invention, particularly those prepared with VO-M, have the capacity to accept and retain many of a wide variety of dyestuffs, including acetate, direct, acid and vat dyes. They are thus adapted to imbue the polymeric fiber-forming compositions in which they may be incorporated with such desirable dye-receptive properties. In addition, probably due to the cross-linking effect which is obtained in their molecular configurations, they are insoluble in water and may thus be permanently retained in shaped articles from polymeric fiber-forming compositions in which they are incorporated, despite exposure and subjection of the shaped articles to water under extremely extractive conditions. This, of course, permits minimum quantities of the copolymers to be employed in the fiber-forming compositions so that they retain their desirable fiber-forming properties in a substantially undiminished manner. Frequently, for example, a quantity of the copolymer that is only in the amount of about 10 percent or less by weight of the polymer content of a fiber-forming composition may be employed satisfactorily as a dye-assisting adjuvant. Furthermore, the permanent retention of the water-insoluble copolymers of the invention facilitates the achievement of dyed, shaped articles from such compositions that have excellent washfast characteristics.

The invention is further illustrated in and by the following examples wherein, unless otherwise indicated, all parts and percentages are to be taken by weight.

*Example "A."*—About 36 parts of VO-M and 4 parts of diallyl glycerol are dissolved in 160 parts of water which contains about 4 parts of $\alpha,\alpha'$-azobisisobutyronitrile. The resulting mixture is then adjusted to a pH of about 8 with ammonium hydroxide. The polymerization system is maintained without agitation for a period of about 16 hours at a temperature of about 50° C. A white, gel-like product is obtained which, after being dried, washed with water and further dried, yields about 30 parts of a water-insoluble copolymer that contains about 88 percent of VO-M polymerized in the copolymer molecule.

The copolymer product, after being finely divided by comminution in a ball mill, is incorporated in the amount of about 10 percent by weight, based on the weight of total polymer, in a polyacrylonitrile fiber-forming spinning solution which is wet spun into good quality fibers that have excellent dyeability with Calcodur Pink 2BL (C.I. 353), a direct dyestuff.

*Example "B."*—About 36 parts of VO-M and 4 parts of triallyl cyanurate dissolved in about 160 parts of water which contains enough aqueous 28 percent by weight ammonium hydroxide solution to provide a pH of 6 in the mixture and 0.8 part of $K_2S_2O_8$ are employed in the polymerization system for preparing a copolymer product in accordance with the invention. The polymerization is conducted in a closed vessel with agitation for 16 hours at a temperature of about 50° C. The water-insoluble VO-M/triallyl cyanurate copolymer that is obtained contains an amount of polymeric solids which represents about a 90 percent conversion of the reactant monomers. The copolymer product is highly suitable for impregnating a polyacrylonitrile fiber in a aquagel condition in order to obtain a fiber-product that is readily dyeable with Amacel Scarlet BS, an acetate dyestuff, Calcodur Pink 2BL, a direct dyestuff, and Calcocid Alizerine Violet and Xylene Milling Black Acid dyestuffs. The copolymer containing fiber products do not lose significant amounts of the impregnated copolymer, even when they are subjected to water under such severe conditions as scouring at the boil in a strong aqueous solution of a detergent.

*Example "C."*—About 20 parts of VO-M and 20 parts of tetraethyleneglycol dimethacrylate are dissolved in about 160 parts of water which contains about 0.4 part of $\alpha,\alpha'$-azobisisobutyronitrile and enough ammonium hydroxide solution to effect a pH of 6 in the polymerization mixture. The polymerization is conducted in a closed vessel under agitation for about 16 hours at a temperature of about 50° C. About 28 parts of the VO-M/triallyl cyanurate copolymer is obtained.

*Example "D."*—About 9 parts of VO-M and 1 part of triacrylylperhydrotriazine are dissolved in about 200 parts of water which contains about 0.11 part of an aqueous 28 percent ammonium hydroxide solution, 0.8 part of an aqueous 5 percent hydrogen peroxide solution, and 0.25 part of a nonionic polyoxyethylated fatty alcohol type of synthetic detergent material. The mixture is employed in a polymerization system for preparing an emulsified copolymer product. The polymerization is conducted in a closed vessel under agitation for 16 hours at a temperature of about 50° C. After this period, an additional 0.8 part of the aqueous 5 percent by weight hydrogen peroxide solution is added to the reaction mass which is then subjected to further polymerization with agitation in the closed vessel for an additional 16-hour period at a temperature of about 50° C. The finely divided emulsion of the water-insoluble VO-M/triallyl cyanurate copolymer that is obtained contains an amount of polymeric solids which represents about a 98 percent conversion of the reactant monomers.

Similar excellent results may be obtained when other proportions of VO-M are polymerized in the copolymer products of the invention and when other VO-X monomers, particularly N-vinyl-4-methyl-2-oxazolidinone; N-vinyl-5-ethyl-2-oxazolidinone; N - vinyl-5-phenyl-2-oxazolidinone and the like, are utilized for their manufacture. Equivalent results may also be obtained when other of the polyfunctional comonomers mentioned in Tables A–E, or their readily apparent equivalents, are employed in the preparation of the dye-receptive and water-insoluble copolymers.

What is claimed is:

1. Dye-receptive, water-insoluble, normally solid, cross-linked copolymer of (A) from between about 2 and 98 weight percent, based on the weight of the copolymer, of a ring-substituted N-vinyl-2-oxazolidinone monomer of the formula:

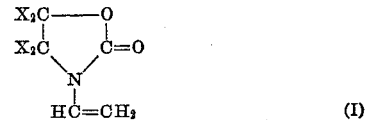

wherein each X is independently selected from the group consisting of hydrogen, alkyl radicals that contain from 1 to about 4 carbon atoms and aryl radicals that contain from 6 to about 10 carbon atoms with the limitation that not more than three of the X substituents can be hydrogen, and (B) between about 98 and 2 weight percent, based on the weight of the copolymer, of a non-resinous cross-linking, polyfunctional, ethylenically unsaturated monomer that contains at least two polymerizable ethylenically unsaturated constituents and is copolymerizable with said monomer of the Formula I.

2. The copolymer of claim 1, containing from about 50 to 98 weight percent of the monomer of Formula I.

3. The copolymer of claim 1, containing about 90 weight percent of the monomer of Formula I.

4. The copolymer of claim 7, wherein said monomer of the Formula I is N-vinyl-5-methyl-2-oxazolidinone.

5. The copolymer of claim 1, wherein said monomer of the Formula I is N-vinyl-5-ethyl-2-oxazolidinone.

6. The copolymer of claim 1, wherein said monomer of the Formula I is N-vinyl-5-phenyl-2-oxazolidinone.

7. The copolymer of claim 1, wherein said polyfunctional monomer is methylene-bis-acrylamide.

8. The copolymer of claim 1, wherein said polyfunctional monomer is divinyl benzene.

9. The copolymer of claim 1, wherein said polyfunctional monomer is diallyl glycerol.

10. The copolymer of claim 1, wherein said polyfunctional monomer is tetraethyleneglycol dimethacrylate.

11. The copolymer of claim 1, wherein said polyfunctional monomer is triallyl cyanurate.

12. The copolymer of claim 1, wherein said polyfunctional monomer is triacrylylperhydrotriazine.

References Cited in the file of this patent
UNITED STATES PATENTS

| | | |
|---|---|---|
| 2,801,224 | Greer | July 30, 1957 |
| 2,818,362 | Drechsel | Dec. 31, 1957 |